(12) United States Patent
Zenere

(10) Patent No.: US 10,953,462 B1
(45) Date of Patent: Mar. 23, 2021

(54) MODEL FOR THE CREATION OF A MOLD FOR INVESTMENT CASTING AND METHOD FOR INVESTMENT CASTING OF AN OBJECT

(71) Applicant: DWS s.r.l., Thiene (IT)

(72) Inventor: Sergio Zenere, Carrè (IT)

(73) Assignee: DWS S.R.L., Thiene (IT)

( * ) Notice: Subject to any disclaimer, the term of this patent is extended or adjusted under 35 U.S.C. 154(b) by 0 days.

(21) Appl. No.: 16/744,422

(22) Filed: Jan. 16, 2020

(51) Int. Cl.
*B22C 9/22* (2006.01)
*B22C 7/02* (2006.01)
*B33Y 80/00* (2015.01)
*B33Y 50/02* (2015.01)

(52) U.S. Cl.
CPC ............. *B22C 9/22* (2013.01); *B22C 7/02* (2013.01); *B33Y 80/00* (2014.12); *B33Y 50/02* (2014.12)

(58) Field of Classification Search
CPC ............. B22C 9/22; B22C 7/02; B33Y 80/00
See application file for complete search history.

(56) References Cited

U.S. PATENT DOCUMENTS

2014/0262107 A1\* 9/2014 Hanrahan .............. B33Y 10/00
164/34

\* cited by examiner

*Primary Examiner* — Kevin P Kerns
*Assistant Examiner* — Steven S Ha
(74) *Attorney, Agent, or Firm* — Volpe Koenig

(57) ABSTRACT

An investment casting model for the creation of a mold for investment casting of a plurality of objects, the investment casting model being realized in solidifiable resin, and includes: a base defining a Z axis; a plurality of wire-like elements all extending from the base, the wire-like elements intersecting each other to form a plurality of simple closed curves, which form a net around the Z axis. At least two of the simple closed curves of the plurality are identical to each other and the net includes: at least a first and a second sets of simple closed curves, each set forming a net sub-structure around the Z axis, the second set being adjacent to the first set along the Z axis; a plurality of object models; and a plurality of connecting branches joining the plurality of object models to the wire-like elements forming the net.

13 Claims, 10 Drawing Sheets

MODEL FOR THE CREATION OF A MOLD FOR INVESTMENT CASTING AND METHOD FOR INVESTMENT CASTING OF AN OBJECT

FIELD OF THE INVENTION

The present invention relates to a model for the creation of a mold for the production of objects by investment casting and a method for creating an object by investment casting.

BACKGROUND

Investment casting (also called lost wax casting) is the technique of creating metal objects, such as jewelry, which involves pouring a liquid metal alloy into a mold. The casting mold is made using a wax model, that is then dissolved to leave an empty space inside the mold.

The first step in the lost wax casting process is thus forming the wax model, for example by wax molding: the wax is injected into special molds that give the wax the shape of the objects to be reproduced. The wax objects produced by injection molding of the wax are assembled on a sprue structure, having often the form of a casting shaft. The casting shaft itself is made of wax; the wax objects are attached to the casting shaft by heating and fusion of more wax. The casting shaft generally includes a "central trunk" from which various "branches" branch out. The wax objects to be reproduced are attached to these branches. The process of attaching the wax objects to the branches of the casting shaft is generally carried out by hand by the so-called "wax mold makers", who attach the wax objects to the branches according to an arrangement that tries to maximize the number of objects per casting shaft.

The entire wax model, including the sprue structure and the wax objects thus assembled, is immersed in a bath of a special material. The special material is selected depending on the characteristics of the final objects to be made and in particular on the metal used. The bath can be made for example of plaster or ceramic, in order to create an inert shell that can withstand the melting temperature of the metal subsequently introduced. Once the bath is dry, the wax is removed from the shell by heating. For example, the wax can be collected and reused for a new process.

The metal is then poured inside the cavity left in the shell by the removed wax. The metal pouring may be done by gravity.

When the metal has cooled and solidified, the shell is broken and the pattern (i.e. sprue structure and objects) once formed in wax is now formed in metal. The raw objects are removed from the casting shaft (now made of metal), for example by cutting. The objects are then possibly further processed and finished, if required.

In this process, the step of attaching wax objects to the branches of the casting shaft requires considerable manual work, which increases the costs of the process as a whole. Furthermore, the process—being manual—is never perfectly reproducible.

With the advent of 3D printing machines (such as stereolithographic machines), it has been realized that it is possible to obtain the "wax model" through a 3D printing process, using—instead of wax—a resin that could be both polymerizable by laser and then molten at a desired temperature in order to be removed from the shell.

However, a casting shaft having the central trunk of "considerable" dimensions so as to obtain the desired cavity in the mold is not easy to realize through modern stereolithographic techniques. As known, in 3D printing, a resin is inserted inside a tank or chamber. The resin is generally polymerized layer by layer. Each layer represents a section of the finished object to be printed. In each layer, light irradiation is performed, such as UV radiation, or a laser light is "scanned" over the desired portion. Once the scan or irradiation has been carried out, a displacement is made along the vertical axis to form a new layer above (or below) the layer just irradiated, so as to create the object section by section, developing it vertically. However, if in each layer a portion of resin having substantially the same coordinates in a (X, Y) plane is polymerized, a rapid deterioration of the resin tank is obtained. Indeed, a continuous irradiation of the same area for each layer, or the scanning of the laser on the same area of each layer, causes damage to the material forming the tank. Since there is a vertical "central trunk" in the casting shaft, resin needs to be polymerized always in the same area in all layers. In order to solve this problem, either the size of the "casting trunk" is kept smaller than required, to minimize the damage, or a continuous replacement of the resin tank is required.

The object of the present invention is therefore to provide a model for the creation of a mold for investment casting having the same functions as the "wax" model described above, but which is made in resin polymerizable by 3D printing and also does not require a quick substitution of the resin tank. Further, another object of the invention is to provide a method for investment casting of an object which can use the 3D technologies known in the art without major modifications.

SUMMARY

According to an aspect, the invention relates to an investment casting model for the creation of a mold for investment casting of a plurality of objects, the investment casting model being realized in solidifiable resin, and comprising:
  a base defining a Z axis;
  a plurality of wire-like elements all extending from the base, the wire-like elements intersecting each other to form a plurality of simple closed curves, the plurality of simple closed curves forming a net around the Z axis;
  wherein at least two of the simple closed curves of the plurality are identical to each other and wherein the net comprises at least a first and a second sets of simple closed curves, each set forming a net sub-structure around the Z axis, the second set being adjacent to the first set along the Z axis;
  a plurality of object models;
  a plurality of connecting branches joining the plurality of object models to the wire-like elements forming the net.

According to another aspect, the invention relates to a method for investment casting a plurality of objects, the method comprising:
  a. forming a tri-dimensional image of the object to be cast;
  b. forming a tri-dimensional image of an object model using the tri-dimensional image of the object;
  c. forming a tri-dimensional image of a sprue structure to support a plurality of object models, the sprue structure including
    i. a base defining a Z axis;
    ii. a plurality of wire-like elements extending from the base, the wire-like elements intersecting each other to form a plurality of simple closed curves, the plurality of simple closed curves forming a net around the Z axis;

iii. wherein at least two of the simple closed curves of the plurality are identical to each other and wherein the net comprises at least a first and a second sets of simple closed curves, each set forming a net sub-structure around the Z axis, the second set being adjacent to the first set along the Z axis;
d. creating a tri-dimensional image of an investment casting model including a plurality of the tri-dimensional images of the object models connected to the tri-dimensional image of the sprue structure;
e. realizing the investment casting model in solidifiable resin by 3D printing using the tri-dimensional image of the investment casting model;
f. forming a mold inserting the investment casting model in a bath of a shell-forming material and hardening the shell-forming material;
g. removing the solidifiable resin forming the investment casting model from the mold;
h. pouring a molten substance into the mold;
solidifying the molten substance; and
removing the solidified substance from the mold.

According to the invention, an investment casting model for the creation of a mold for investment casting is formed. The mold is used to cast a plurality of objects. The objects might be for example jewels or dental components. The objects may be in metal or in any other liquid substance which can be introduced in a mold to solidify and form the objects.

The investment casting model is realized in a solidifiable resin. In particular, the investment casting model is formed in a resin suitable for 3D printing. The resin may be polymerizable or cross-linkable by means of photons' irradiation. The resin may be a photopolymerizable resin.

The investment casting model comprises a plurality of object models. Each object model is the resin model of the object to be realized. Therefore, it is desirable that several object models are included in the investment casting models, so that several objects are obtained by the same investment casting process.

The object models can be all identical to each other. Alternatively, more than one type of object model is present. Preferably, only one or two types of different object models are included in the investment casting model of the invention.

Further, the investment casting model includes a sprue structure, to which the object models are connected.

Although spruing techniques are well known, particularly in the formation of molds by investment techniques, a very brief description will now be given of the conventional mold forming process so that the function of the various structures present in the investing casting model of the invention becomes clear.

In a conventional process and apparatus, the sprue structure would essentially take the form of a substantially straight, runner bar mounted to an apex of a sprue base. Several branches depart from this straight bar. This configuration of the sprue structure is also called casting shaft and it is made of wax. The object models, generally made of wax, for example wax object models carefully developed by an artisan to a particular size and shape and with particular detail, are attached to the branches via pins. The ultimate goal of such mold forming techniques is the formation of a casting, such as a metal casting, having the precise size, shape and detail of the wax models. A mold capable of forming such a metal casting is formed by embedding the wax model formed by the object models and the sprue structure (also called wax pattern in the technical field) in an investment material.

The investment material is a conventional material in the field, which is poured over the wax models of the objects and sprue structure and sprue base. After embedment of the wax models within the investment material, the wax object models and investment material are subjected to heat. The heat melts the wax and therefore in the investment material "a negative" of the wax model remains. In detail, cavities having the shape of the object models are present, as well as pathways or channels connecting the cavities left by the wax object models to the exterior of the mold. These pathways or channel are the "negative" of the sprue structure. At the same time, heat often induces solidification of the investment material.

A large body of technology exists relative to formation of molds such as the mold above described. A casting material, such as a molten metal or metal alloy, is then injected into such molds using a centrifuge for formation of a casting. Castings of this type can be used in a variety of situations which vary from jewelry items to dental prostheses. While the present invention will be described within the environment of jewels, it should be understood that the apparatus and method of the invention can be utilized to form castings useful in other situations.

If, instead of a manual process, a stereolithographic method is used, instead of wax, the investment casting model, e.g. the object models and the sprue structure, is formed in a resin suitable for 3D printing. First, a tri-dimensional image, such as for example a CAD image, of the investment casting model is preferably created, and then it is "printed" in resin according to a standard stereolithographic process.

The investment casting model is preferably made with certain geometries and structures so that at least one of the following conditions is met. First of all, three-dimensional printing of the investment casting model has to be possible, which is not always possible with all geometries. Since the investment casting model is used to create a mold (the outer surface of the investment casting model is the surface of the mold cavity, as better detailed below), it should preferably possess adequate strength in the mold creation phase. Moreover, the geometric properties of the investment casting process preferably give to the cavity made with the model in the mold the fluid dynamic qualities suitable for molten metals or other liquid substances. In other words, when a molten substance is poured in the mold, it is preferably capable to reach all cavities present therein. This is possible if the "channels" created by the sprue structure impart to the flow of molted substance the proper dynamic.

The molten metal may be preferably both noble and non-noble metals. Preferably, metals include precious alloys and alloys intended for contact with the skin. However, also liquid substances not belonging to the metal family can be used as well.

The present invention relates—among others—to the investment casting model specific shape and/or geometry which optimizes the production of the investment casting model by 3D printing. Further, the invention relates to the process of investment casting of objects by 3D printing, using a mold created using the investment casting model of the invention.

The sprue structure of the invention includes a base. The base corresponds to that part of the mold from which the molten metal or other liquid substance is poured. The base extends for a given height along a Z axis. The Z axis may be considered as a virtual continuation of the base along a given axis.

The shape of the base can be any. The base may have preferably the form of a cylinder or of a cone, or it may be frustoconical. The Z axis is, in this embodiment, the axis of the cone or of the cylinder. The diameter of the cylinder, in case of a cylindrically-shaped base, may be comprised between 1 mm and 10 mm.

The sprue structure defines a first and a second end. Preferably the base is located at the first end of the sprue structure. Therefore, the base defines the "0" coordinate for the Z axis.

The Z axis is considered in the following as the "vertical axis" and therefore the extension of any component along the Z axis is called the height of the component. It is to be understood that this is a convention and the model of the invention can have a Z axis oriented in any direction. In the latter case, however, it is always possible to select a coordinate system where the Z axis is the vertical axis.

Further, the sprue structure includes a plurality of wire-like elements. With wire-like element, an elongate element, having a length bigger than the dimensions of its cross section, is meant. The wire-like elements can have any cross section, for example a circular cross section can be considered. Quadratic or polygonal cross sections are however also used.

The wire-like elements all departs from the base. The base therefore is substantially a central element of the sprue structure. It is however not necessary that the base is located at a geometrical center of the sprue structure.

Each wire-like element has a first end attached to the base and a second end. The wire-like elements extend starting from the base for at least a first portion along the Z axis. A wire-like element extending along the Z axis means that the second end is located "higher" along the Z axis than the first end. If the second end is higher than the first end along the Z axis, it means that the wire-like element does not lie in a plane perpendicular to the Z axis and there is a component of the wire-like element which is parallel to the Z axis. The wire-like element may include straight portions, or it can include curved portions, or both.

Preferably, each-wire-like element, being relatively "thin", can be considered as defining a curve. The curve is a monotonic function. More preferably, it is an increasing function, that is, its ordinate (Z coordinate) increases in value moving from the first end to the second end.

In the following, as a convention, the base is considered as the "bottom" of the investment casting model. The wire-like elements preferably extend all above the base along the Z direction (thus the wire-like elements preferably extend all in the same direction).

Preferably, the cross section of the wire-like elements at the first end has a bigger dimension, such as a bigger diameter, than the dimension of the cross section of the wire-like elements at the second end. Preferably, the dimension of the cross sections of the wire-like elements decreases monotonously moving from the first end towards the second end.

With dimension of the cross section, the following dimension is considered. Cross sections are taken in planes substantially perpendicular to the direction of extension of the wire-like element. The cross section of the wire-like element defines a closed curve, which is the outer boundary of the cross section. The dimension of the cross section is considered as the longest segment among all segments connecting any two non-adjacent points in the above mentioned curve.

For example, in case of a circular cross section, the dimension is the diameter of the circumference. In a square cross section, the dimension is the diagonal of the square. In a elliptic cross section, the dimension is the major axis of the ellipse.

The dimension of the cross section of the wire-like elements is preferably dependent, more preferably proportional, to the number of model objects connected to the sprue structure. A "large" number of objects need a relatively big dimension, in order to allow the molten substance to reach all objects when the investment casting model is used as a "negative" for a mold where the molten substance is introduced.

Preferably the dimension of the cross section of the wire-like elements at the second end is reduced by between 20% and 60% of the initial dimension of the cross section at the first end, that is dimension at second end=(dimension at first end)−(20%-60%)×(dimension at first end).

Preferably, the dimension of the cross section at the first end is comprised between 2 mm and 8 mm. The dimension of the cross section at the second end is preferably comprised between 1 mm and 6 mm.

Preferably, the first ends of all the wire-like elements are positioned at the same first height along the Z axis. In other words, the points on the base from which the wire-like elements depart have all the same Z coordinate.

Preferably, the second ends of all the wire-like elements are positioned at the same second height along the Z axis. The second ends may define the "highest" points along the Z axis of the investment casting model.

Preferably, the dimension of the cross section of the wire-like elements at the first end is the same for all wire-like elements. Preferably, the dimension of the cross section of the wire-like elements at the second end is the same for all wire-like elements.

Depending upon the dimension of the wire-like elements, the number of wire-like elements departing from the base is comprised between 3 wire-like elements and 20 wire-like elements. The number of wire-like elements depends on the objects' size.

From the base, the wire-like elements depart. In a first portion, the wire-like elements are substantially perpendicular to the Z axis. This first portion forms an angle with the Z axis comprised preferably between 80° and 90°. A small angle in the mentioned range increases the flow speed of the molten substance introduced in the mold when the investment casting model is used as a "negative" to create the mold. A big angle increases the maximum possible number of objects model to be attached to the sprue structure. Preferably, the first portion is straight. The length of the first portion depends on the dimension in a direction perpendicular to the Z axis of the model. The dimension of a cross section of the model taken along a plane perpendicular to the Z axis is preferably comprised between 20 mm and 300 mm.

Preferably, the total height of the sprue structure, including its base, from the first to the second end of the sprue structure, is comprised between 50 mm and 500 mm. The height of the sprue structure along the Z axis is possibly limited by the printing size limits of three-dimensional (3D) printing machines. In other words, each 3D printing machine has generally a maximum number of successive layers that can print. Therefore, the maximum height of the sprue structure is defined by the maximum height allowed by the 3D printing machine used. However, two investment casting models may be joined together along the Z axis to overcome this problem.

In addition to the first portion substantially perpendicular to the Z axis, each wire-like element preferably comprises a second portion attached to the first portion. Each second portion has preferably a major component along the Z axis. The second portion is connected to the first portion preferably by means of a bend.

In their extension along the Z axis, the wire-like elements intersect with each other. Each second portion of the wire-like element of the plurality is in contact with at least another second portion of another wire-like element of the plurality. In this way, by means of the intersections of the wire-like elements of the plurality, a plurality of simple closed curves are formed. A single closed curve, or connected curve, is a curve that does not cross itself and ends at the same point where it begins. Examples of simple closed curves are circles, ellipses, and polygons. In some closed curves, there are portions of the curve belonging to two different wire-like elements. Preferably, in each closed curve, there are portions belonging to at least two different wire-like elements. The closed curves may be formed by a plurality of edges or curved parts.

Two wire-like elements are different if they connect to the base at two different points, that is, if they have different first ends.

The sprue structure may include all identical single-closed curve, that is, all the single closed curves formed by intersecting the wire-like elements have substantially the same shape, with possibly the exception of the curves formed at the first and second ends of the sprue structure, or it may include more than one shape. Preferably, the sprue structure includes single closed curves of less than three different shapes.

The plurality of simple closed curves forms a net. The net is substantially a meshed structure formed by the continuous intersections of the wire-like elements. The net is formed by the plurality of single closed curves connected to each other.

Further, the net surrounds the Z axis, at least for a range of coordinates along the Z axis. A projection of the net on a plane perpendicular to the Z axis defines a closed curve. Within the closed curve, the Z axis is included. Thus, considering a frame of reference (X,Y,Z) where the vertical axis is the Z axis of the investment casting model, the projection of the net between two Z coordinates on the (X,Y) place defines a loop around the Z axis.

The net formed by the wire-like elements defines a sleeve which is positioned around the Z axis. The Z axis does not need to be at the center of the sleeve.

The Z axis, for a given coordinate range along the Z axis, is thus surrounded by the net in all directions.

The projection of the net between two Z coordinates on the (X,Y) place may define a closed curve of any shape. Preferably, the curve is substantially a circle or an ellipse.

The envelope of the net defines a surface, which is sleeve-shaped. Mathematically, the surface is the surface of a cylindroid.

The net is "big enough" to include at least two sets of simple closed curves, each set forming a loop around the Z axis. Each set thus defines a sub-net which is sleeve-shaped. The two sets of simple closed curves are positioned one on top of the other along the Z axis and each of them is encircling the Z axis. The two sets of simple closed curves are substantially a portion of the whole net forming a ring around the Z axis. The two sets can be considered as a portion of the whole net taken between two planes parallel to each other and perpendicular to the Z axis.

The sprue structure terminates with the second ends of the wire-like-elements, which preferably correspond to the second end of the sprue structure. The second ends of the wire-like elements may be "free" or connected to other wire-like elements. For example, the second ends of the wire-like elements may converge to the same point (same height) which is the "apex" of the sprue structure. The second ends of the wire-like elements may converge to different points.

Alternatively, the second ends of the wire-like elements are not in contact with each other. Alternatively, second ends of some wire-like elements of the plurality of wire-like elements are not free, while other wire-like elements of the plurality are free.

Further, a wire-like element departing from the base may split in several wire-like elements. This means that a wire-like element of the plurality may have a single first end attached to the base and a plurality of second ends. Alternatively, the wire-like element that splits in several wire-like elements may have a single first end and also a single second end, because the "additional branches" of the wire-like element may terminate when contacting or intersecting another wire-like element.

The sprue structure also comprises a plurality of connecting branches. Each connecting branch departs from a wire-like element and terminates with an object model. The branch can also split in a plurality of sub-branches while extending from the wire-like element, thus a single branch which starts from the wire-like element can split in N (where N>1) sub-branches so that N objects are connected to a single point of the wire-like element.

Further, a single object model can be connected to several connecting branches, in case the object model has a relatively "big" size.

Each object model may be connected with one or more connecting branches to the net. Thus each object model may be supported by one or more branches. Further, a single branch may support more than one object model.

The model objects can be all identical, or different from each other.

The sprue structure together with the object models attached thereto form the investment casting model made in resin used to form a mold. The object models form in the mold the cavities to be filled with molten substance in order to create the real objects which are desired, while the sprue structure forms the channels within the mold that allows the molten substance to reach the cavities defining the objects to be created.

Due to the specific shape of the sprue structure, a high number of objects can be formed by investment casting at the same time.

This is due thanks to the relatively wide area defined creating a net intersecting the wire-like elements. The net envelope defines a wide surface to which the object models can be attached.

Further, the net creates, due to its geometry, a substantially stable structure. A stable substantially "self-supporting" structure (e.g. free-standing) makes the operations of creating the mold relatively easy. This stability may also allow positioning the object models very close to the net itself, so that the connecting branches are relatively short. This is turn is an advantage during the distribution of the molten substance when introduced in the mold formed by means of this investment casting model, e.g. the cavities where the objects are formed are easily created. Further, the necessary quantity of molten substance is reduced, due to this length reduction of the branches.

To the above, all advantages of forming the investment casting model by 3D printing are to be added. Forming the investment casting model by 3D printing instead of manually attaching wax elements requires much less time. Furthermore, all parameters of the investment casting model can be easily controlled by computer, so that any change can be made to an image of the investment casting model before printing. The number of possible errors or mistakes is therefore minimized. The investment casting model of the invention has an optimized structure for 3D printing because, due to the net structure, the number of layers where the resin has to be irradiated in the same area is minimized. This allows a minimal damage to the tank.

In the present description and in the subsequent claims, the terms "three-dimensional (or 3D) printing" and "three-dimensional 3D printer" mean the technology that produces three-dimensional objects through a plurality of superimposed layers, in which each layer is obtained by selective solidification of a fluid substance (a resin) in the areas corresponding to the volume of the object to be produced. In particular, in the present description and in the subsequent claims, three-dimensional 3D printing can be a stereolithography, such as for example a stereolithography with laser scanning or a technology known commercially as DLP® (Digital Light Processing), or a "multi-jet modelling", such as commercially known technologies as "Stratasys Objet" and "3D Systems multi-jet", or a technology used by the Solidscape company. These three-dimensional objects formed by 3D printing will also be indicated, in the present description and in the subsequent claims, as "three-dimensional models" or even simply as "models". In particular, reference is made to the case in which the three-dimensional models are the aforementioned object models for investment casting which allow the creation of molds to form the objects to be produced.

A three-dimensional 3D printer of a known type comprises a tank in which the fluid substance is arranged, generally a photosensitive resin in the liquid or pasty state. In the present invention, the investment casting model is made with a resin suitable for three-dimensional printing which furthermore has a melting temperature suitable to be used in a mold (it needs to be liquefied and removed from the mold at a suitable temperature). For example one of the FUSIA series resin, INVICTA series resin, DS3000 series resin, 095 series resin, 375 series resin, 385 series resin, 395 series resin, as commercialized by the same Applicant, can be used.

The 3D printer further comprises a source, generally of a luminous type, which emits a radiation suitable for solidifying the resin (one also speaks of polymerization of the photosensitive resin). An optical assembly conveys the aforesaid radiation towards a reference surface arranged inside the tank, which corresponds to the position in the layer of the investment casting model to be solidified. The three-dimensional investment casting model in formation is supported by a modelling plate, which is movable with respect to the tank in order to arrange the last solidified layer of the investment casting model in a position adjacent to the aforementioned reference surface. In this way, after each layer has been solidified, the modelling plate is moved so as to arrange the solidified layer again adjacent to the reference surface, after which the process can be repeated for the next layer.

The resin model for investment casting is completed when all the layers forming it have been polymerized.

The displacement of the modelling plate, which can be in any of the two directions of an axis, defines the Z axis of the investment casting model. Therefore, the investment casting model has as Z axis, the Z the axis defined during its three-dimensional printing.

The Z axis remains defined as the growth axis during three-dimensional printing. The investment casting model is made of a suitable resin, for example photo-polymerizable, which is solidified by layers as described above.

Once the vertical axis Z is defined, a plane perpendicular to it, called plane (X, Y), is defined as well.

As aforesaid, the investment casting model is made through a three-dimensional printing process. Therefore, in order to make this print, a virtual 3D image of the investment casting model is preferably created, for example as a CAD file. In other words, in order to make the print, a three-dimensional representation is preferably made in a digital file of the shape to be obtained and that is the digital form of the investment casting model.

Therefore, a digital representation (3D image) of the object(s) to be created is preferably formed, again for example by CAD. From this representation, a digital representation (3D image) of the object model may be formed. The object model is going to be the "negative" in a mold to form the object. The same process applies to the sprue structure: a digital representation (3D image) of the sprue structure is preferably obtained. Thus, 3D images of the object models and of the sprue structure are preferably available. A single 3D image of a investment casting model is then preferably formed, where the object models are connected to the sprue structure. The way in which the model objects are connected to the sprue structure is also represented digitally, so that a 3D image of the whole investment casting model is preferably created. This digital representation of the investment casting model is called digital investment casting model.

This single 3D image is processed as an image for an investment casting model to be printed via 3D printing. Therefore, for example, a division of the digital investment casting model in layers is made and the thickness of each layer is set, as in a standard 3D printing process.

While creating the 3D image of the investment casting model, it is also possible to study the fluid dynamics that such an investment casting model would create when used to form a mold (its negative).

The digital file of the investment casting model preferably thus also contains all the information needed so that it is properly printed in a 3D printing process. The digital investment casting model is transmitted or imported into a 3D printing apparatus to produce the investment casting model according to the invention. The printed resin investment casting model has substantially the same dimensions and shape as defined by the digital investment casting model. The 3D printing device is preferably programmed to produce the resin investment casting model by subsequently depositing layers of a 3D resin based on the digital investment casting model. The CAD file is appropriately processed so as to be usable in the 3D printing machine, i.e. the "layers" of the digital model are provided. Further, all information regarding the irradiation to be carried out of the layers of resin introduced into the printer are provided as well. However, any other technique, also layer-less, of 3D printing can be used as well.

The 3D printing process is not described in detail here since the process is considered to be known in the reference technical sector. It is however preferred, but not necessarily, to use as a resin for 3D printing which can then be dissolved when immersed in a cast to form a cavity and then to define a mold.

The 3D printer, for example a stereolithographic machine, preferably forms the investment casting model one layer at a time, preferably a horizontal layer at a time, moving the electromagnetic radiation on the resin and solidifying it where it strikes, layer by layer. Each layer is composed of vectors that are typically drawn in the following order: fill and edge.

In a preferred example, in the case of a laser as an electromagnetic source, for each layer, the laser scans an area in the tank according to a scheme envisaged in the digital investment casting model.

The present invention, in any of the mentioned aspects, may comprise in addition or as alternative, any of the following characteristics.

Preferably, each of the simple closed curve comprises a plurality of sides, each side forming an angle different from 0° and 180° with the Z axis.

A side of the simple closed curve is defined as the portion of a wire-like element which is comprised between two intersections of different wire-like elements or between two intersections of two different "branches" of the same wire-like element in case the wire-like element splits in several branches. The side can be straight or curved. This geometry of the simple closed curves is optimal for 3D printing. Having an angle different from 0° and 180° means that the sides are not vertical, that is, they are not parallel to the Z axis. The inclination with respect to the Z axis of the sides of the simple closed curve forming the net allows an optimal flow of the molten substance in the cavity of the mold realized with the investment casting model. In other words, the geometry of the investment casting model described is optimal for the subsequent step of inserting the molten substance into the "negative" made with the investment casting model. The same inclination, due to the fact that the investment casting model grows along the Z axis, means that only a small area in the same position is irradiated for few subsequent layers.

The sprue structure of the invention does not include a central element. The net is substantially self-supporting so there is no need of having a central element, which is generally added in investment casting model of the prior art to have a self-supporting structure.

Preferably, in the case in which the desired investment casting model is particularly large and therefore it is not feasible to be produced with a single printing process, it is possible to foresee several printing processes each obtaining a partial investment casting model. The partial investment casting models are subsequently connected together.

Preferably, in the three-dimensional printing, several investment casting models are created during the same printing process. Groups of investment casting models are made in a single printing step, in other words, at least two investment casting models described above are preferably formed in a single three-dimensional printing process.

Preferably, the net defines an inner volume including the Z axis internal to the net and an outer volume external to the net, and wherein the object models extend both in the inner and outer volume.

The net "separates" an inner volume surrounded by the net, which also includes the Z axis, and an outer volume, outside the net. Due to the relatively large surface defined by the net (by the envelope of it) surrounding the Z axis, the object models can be attached to the net by the connecting branches both in the inner and in the outer volume. In this way, a relatively large number of object models can be obtained with just a single mold. In addition, having object models both in the inner and the outer volume enhances the stability (self-supporting characteristics) of the investment casting model itself.

Preferably, the plurality of simple closed curves comprise triangles, rectangles, rhombi or a combination thereof. The rhombi structure is particularly preferred being easy to produce with a CAD system and a stable net is obtained.

The preferred shapes for the simple closed curves are those that are easy to manufacture by 3D printing and give stability to the net.

Preferably, each simple closed curve comprises a number of sides less or equal to four. The preferred closed curves have three or four sides.

Preferably, the net has an open end opposite to the base. This means that, in a (X,Y) plane perpendicular to the Z axis, the second ends of the wire-like elements do not have all the same (x,y) coordinates. Preferably, the second ends of the wire-like elements define, when virtually connected by a line, a loop around the Z axis.

Preferably, an envelope of the net comprises a portion having a constant cross section. The net has a mathematical envelope which defines a surface. This surface can be seen as a sleeve structure. The envelope of the net includes a portion, comprised between a first and a second parallel planes perpendicular to the Z axis and having a given distance between each other, wherein all cross sections of the envelope taken along planes parallel to the first and the second planes have substantially the same dimension. In other words, the cross sections define curves containing the same area.

Preferably the curves defined by the cross-sections are circle or ellipses.

Preferably, one of the plurality wire-like elements, in its extension along the Z axis, splits in more than one wire-like element. More preferably, a wire-like element in a specific point bifurcates in only two wire-like elements.

Preferably, each wire-like element of the plurality includes a first and a second portion. The second portions of the wire-like elements are the portions forming the net and surround the Z axis. More preferably, each wire-like element of the plurality comprises a first portion connected to the base and substantially perpendicular to the Z axis, or forming an angle with the Z axis comprised between 80° and 90°. As mentioned, this angle is preferred for the flow of molten substance introduced in the mold formed using the investment casting model.

Preferably, the wire-like elements are connected to the base and extend radially from the same. The plurality of wire-like elements forms a star around the base of the model. The base thus is surrounded by the first portions of the wire-like elements extending from it radially at various angles. Preferably, two nearest-neighbor first portions of wire-like elements are separated always by the same angle.

The base represents the entry point of the molten metal towards the rest of the model and in particular the object models, when a cavity is created in a mold through this resin model. The star-like shape of the second portions of the wire-like elements allows a good distribution of the molten substance to be poured in the mold.

Preferably, all the simple closed curves of the plurality are identical to each other. The net is thus formed by the repetition of the same simple closed curve. Fewer parameters are needed to define the net and this simplifies the digitalization of the model.

Preferably, the wire-like elements define a first end and a second end, the first end being connected to the base: The dimension of the cross section of the wire-like element at the first end is bigger than the dimension of the cross section at the second end.

Preferably, the Z axis is a symmetry axis for the net. More preferably, the Z axis is a symmetry axis for the whole investment casting model. A central Z axis increases the self-supporting characteristic of the model.

BRIEF DESCRIPTION OF THE DRAWINGS

The following detailed description of the preferred embodiment of the present invention will be better understood when read in conjunction with the appended drawings. For the purpose of illustrating the invention, there are shown in the drawings embodiments which are presently preferred. It is understood, however, that the invention is not limited to the precise arrangements and instrumentalities shown. In the drawings.

DETAILED DESCRIPTION OF THE PREFERRED EMBODIMENTS

Figures 1, 2:
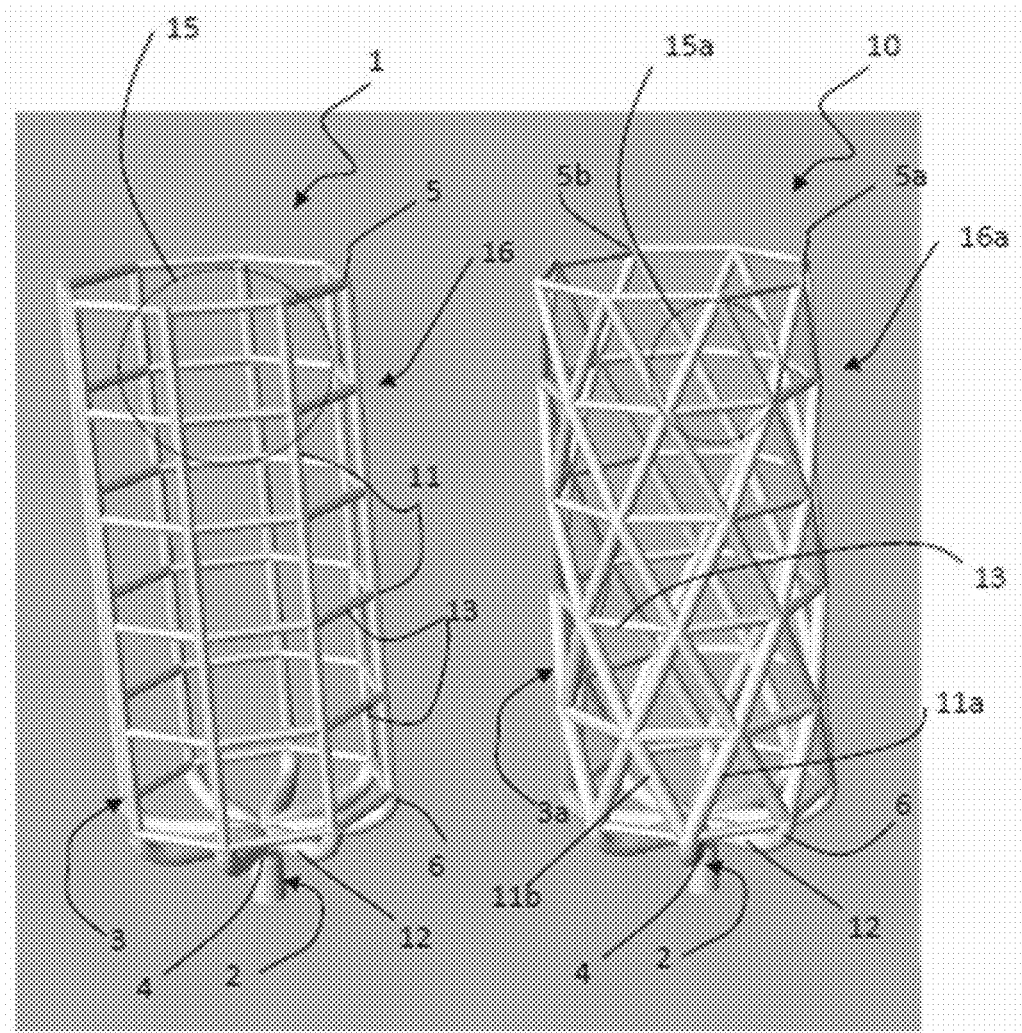
FIG. 1 is a perspective view of a first embodiment of a sprue structure realized according to the present invention.
FIG. 2 is a perspective view of a second embodiment of a sprue structure realized according to the present invention.

With initial reference to FIG. 1, a first embodiment of a sprue structure 1 realized according to the invention is shown.

The sprue structure 1 comprises a base 2, substantially cylindrically shaped, which defines a Z axis. The Z axis is the axis of the cylinder. The sprue structure 1 further includes a plurality of wire-like elements 3, all having a first end 4 and a second end 5. The first ends 4 of the wire-like elements 3 are connected to the base 2. All wire-like elements 3 are identical to each other, simply angularly positioned differently around base 2.

In this embodiment of sprue structure 1, each wire-like element comprises a second portion 11 extending predominantly along the Z axis and a first portion 12 substantially perpendicular to the Z axis, or slightly tilted to orthogonality. The first portions 12 of all the wire-like elements 3 are connected to the base 2 in a stellar manner, that is, they form a star configuration. The angular distance between two second portions of nearest neighbor wire-like elements is preferably the same among all wire-like elements.

The first portion 12 of each wire-like element is substantially straight and substantially perpendicular to the Z axis, or forming an angle close to 90°, preferably 85°. The second portion 11 is connected to the first portion 12 by means of a bend 6. The second portion 11 extends substantially parallel to the Z axis.

Further, each wire-like element 3, along the second portion 11, splits in several wire-like elements at regular spacing along the Z axis. For example, every few cm, the wire-like element 3 splits in two sub wire-like elements.

The wire-like element therefore splits into a continuation of the second portion (still indicated with 11 in the drawings) and into a transversal bar 13 connecting parallel second portions 11 of nearest neighbor wire-like elements. From a single second portion 11, several transversal bars 13 depart, one parallel to the other. In each wire-like element 3, the transversal bars 13 are positioned one above the other at different coordinates along the Z direction and extends all on the same side of the first portion 15. The transversal bars are substantially horizontal, that is, substantially perpendicular to the Z axis. As a convention, a wire-like element 3 bifurcates forming transversal bars 13 only on its right side. The transversal bars 3 intersect the neighboring wire-like element 3. Thus the transversal bars 13 forms a plurality of intersection with the second portion 11 of the neighboring wire-like element 3.

The plurality of wire-like elements 3 thus form simple closed curves 15, which in this case are rectangles. Each rectangle is formed by two parallel transversal bars 13, belonging to the same wire-like element, and by two parallel parts of two parallel first portions 11 belonging to nearest neighbor wire-like elements.

The plurality of rectangles 15 forms a net 16. The envelope of the net forms a cylindroid surface. Cross sections of the envelope of the net 16 along planes perpendicular to the Z axis defines closed curve having the form of an octagon. All octagons have substantially the same size.

With now reference to FIG. 2, a second embodiment of a sprue structure 10 realized according to the invention is depicted.

The sprue structure 10 comprises a base 2, substantially cylindrically shaped, which defines a Z axis, which is the axis of the cylinder. The sprue structure 10 further includes a plurality of wire-like elements 3a, all having a first end 4 and two second ends 5a, 5b (only the two second ends of a single wire-like element are depicted). The first ends 4 of the wire-like elements 3a is connected to the base 2.

In this embodiment of sprue structure 10, each wire-like element comprises two second portions 11a, 11b forming the net and a first portion 12 substantially perpendicular to the Z axis, or slightly tilted to orthogonality. This first portion is identical to the first portion of the first embodiment in FIG. 1. First portion 12 and second portions 11a, 11b are connected at the bend 6. The first portions 12 of all the wire-like elements 3a are connected to the base 2 in a stellar manner, that is, they form a star configuration. The angular distance between two second portions of nearest neighbor wire-like elements is preferably the same among all wire-like elements.

The first portion 12 is substantially straight and substantially perpendicular to the Z axis. The first portion at the bend 6 bifurcates in the two second portions 11a, 11b. The second portions 11a, 1lab are slightly tilted with respect to the Z axis and have a given curvature.

The two second portions 11, 11a form an angle therebetween.

Each second portion 11a, 11b intersects other second portions 11a, 11b of several other wire-like elements 3a in its extension. In addition, at every intersection, one of the two second portions which intersects branches off again creating a transversal bar 13 connecting parallel second portions of nearest neighbor wire-like elements. From a single second portion 11a, 11b several transversal bars 13 depart, one parallel to the other.

The sprue structure 10 includes therefore a single type of wire-like element 3a (that is, all wire-like elements are identical to each other). The wire-like element includes two second portions 11a, 11b, and a first portion 12 which connects the first portions to the base 2. From the second portions 11a, 11b, at a regular spacing, substantially perpendicularly to the Z axis, a transversal bar 13 departs. The transversal bar is substantially horizontal, that is substantially perpendicular to the Z axis.

All transversal bars 13 departing from one wire-like element 3 intersect the nearest neighbor wire-like element 3. The plurality of wire-like elements thus forms simple closed curves 15a, which in this case are triangles. Each triangle 15a is formed by one transversal bar 13 and by two second portions 11a, 11b of two different wire-like elements.

The plurality of triangles 15a forms a net 16a. The net forms as an envelope a cylindroid surface. Cross sections of the envelope along planes perpendicular to the Z axis defines closed curve having the form of an octagon.

Figure 3:
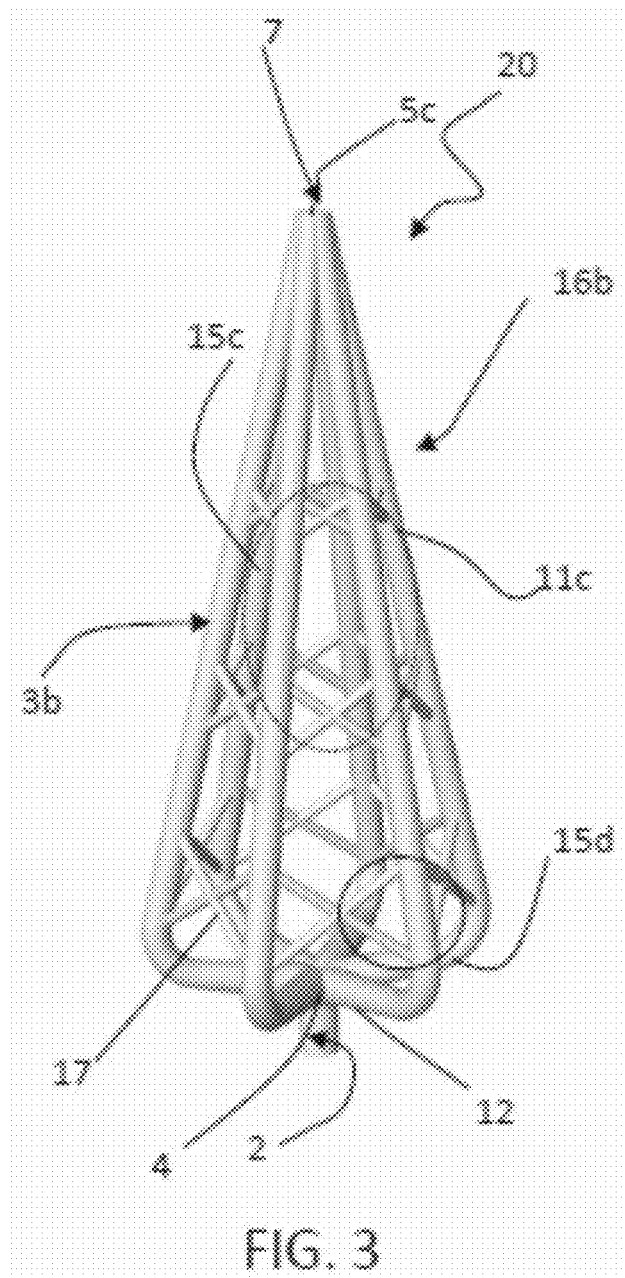
FIG. 3 is a perspective view of a third embodiment of a sprue structure realized according to the present invention.

With now reference to FIG. 3, a third embodiment of a sprue structure 20 is depicted realized according to the invention is shown.

The sprue structure 20 comprises a base 2, substantially cylindrically shaped, which defines a Z axis, which is the axis of the cylinder. The sprue structure 20 further includes a plurality of wire-like elements 3b, all having a first end 4 and a second end 5c. The first ends 4 of the wire-like elements 3b is connected to the base 2.

In this embodiment of sprue structure 20, each wire-like element comprises a first portion 12 identical to first portion described with reference to FIGS. 1 and 2. Further, each wire-like element comprises a second portion 11c connected to the first portion as in the previous examples.

The second portion 11c is straight and it is slightly tilted with respect to the Z axis. All wire-like elements converge with their second ends 5c to the Z axis and intersect each other forming an apex 7 of the sprue structure.

Further, along the second portions 11c, two nearest neighbor wire-like elements are connected by two bars 17 forming a cross. This two bars forming a cross 17 are positioned at regular spacing along the Z axis.

The two bars forming a cross can be considered as branches of the wire-like element which splits in more components.

The sprue structure 20 includes therefore a single type of wire-like element 3c (that is, all wire-like elements are identical to each other). From the second portion 12 of each wire-like element, at a regular spacing, two bars 17 forming a cross depart.

All bars 17 departing from one wire-like element 3c intersect the nearest neighbor wire-like element 3c. The plurality of wire-like elements thus forms simple closed curves 15c, 15d, which in this case are of two types. A first type, 15d, is a triangle formed by two bars 17 and a part of the second portion 11c of the wire-like element. The second type is a polygon, a non regular hexagon, formed by the bars 17 and two parts of the second portion of two nearest neighbor wire-like elements.

The plurality of triangles and hexagons forms a net 16b. Cross sections of the surface along planes perpendicular to the Z axis defines closed curve having the form of an hexagon. The cross section of the net 16b changes.

Figure 5:
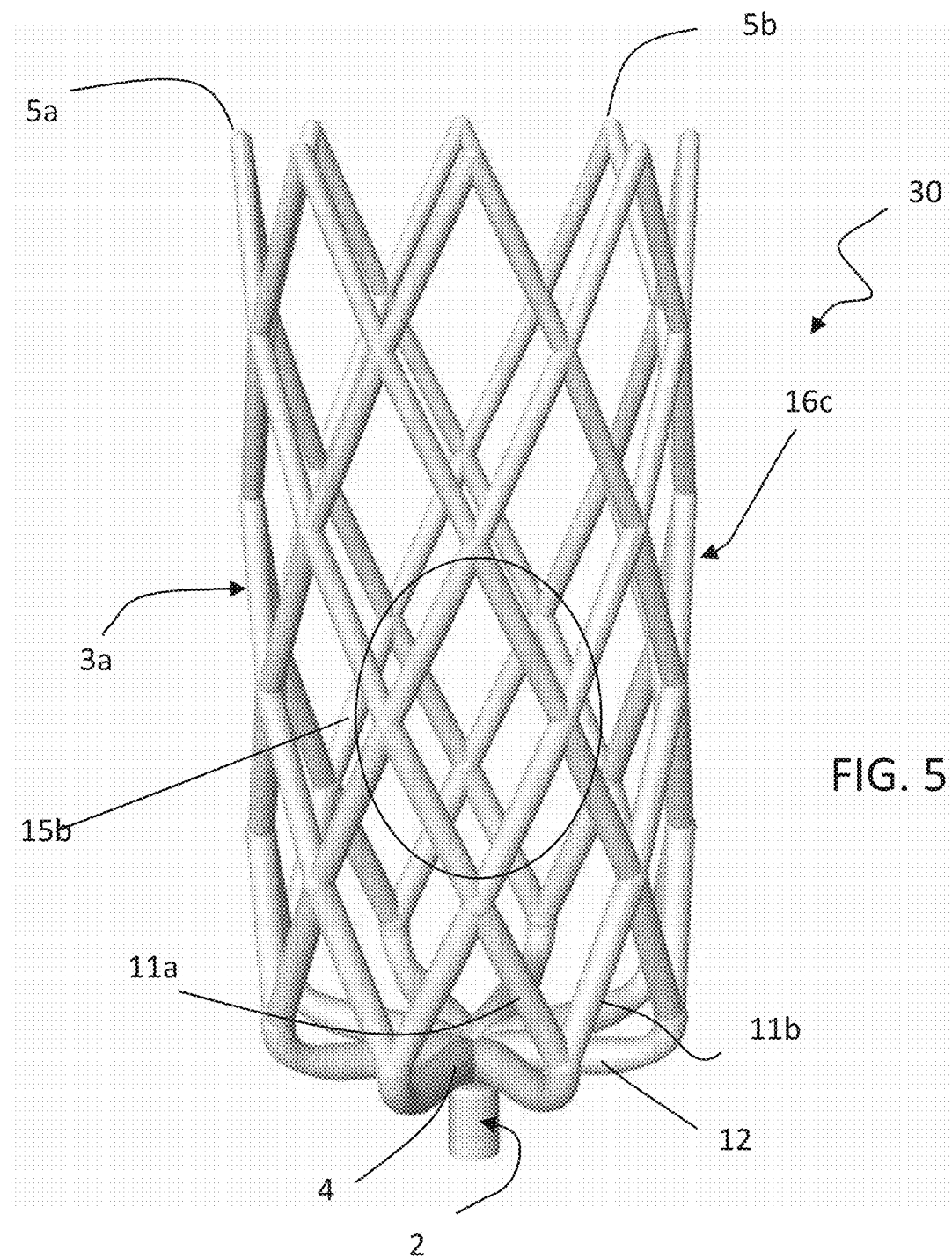
FIG. 5 is a perspective view of a fourth embodiment of a sprue structure realized according to the present invention.

With now reference to FIG. 5, a fourth embodiment of a sprue structure 30 realized according to the invention is depicted. This embodiment is similar to the embodiment of FIG. 2.

The sprue structure 30 comprises a base 2, substantially cylindrically shaped, which defines a Z axis, which is the axis of the cylinder. The sprue structure 30 further includes a plurality of wire-like elements 3a, all having a first end 4 and two second ends 5a, 5b (only the two second ends of a single wire-like element are depicted). The first ends 4 of the wire-like elements 3a is connected to the base 2.

In this embodiment of sprue structure 30, each wire-like element comprises two second portions 11a, 11b forming the net and a first portion 12 substantially perpendicular to the Z axis, or slightly tilted to orthogonality. This first portion is identical to the first portion of the first embodiment in FIG. 1. First portion 12 and second portions 11a, 11b are connected at the bend 6. The first portions 12 of all the wire-like elements 3a are connected to the base 2 in a stellar manner, that is, they form a star configuration. The angular distance between two second portions of nearest neighbor wire-like elements is preferably the same among all wire-like elements.

The first portion 12 is substantially straight and substantially perpendicular to the Z axis. The first portion at the bend 6 bifurcates in the two second portions 11a, 11b. The second portions 11a, flab are slightly tilted with respect to the Z axis and have a given curvature. They are similar to the second portions of wire-like elements of FIG. 2.

The two second portions 11, 11a form an angle therebetween.

Each second portion 11a, 11b intersects other second portions 11a, 11b of several other wire-like elements 3a in its extension.

The sprue structure 30 includes therefore a single type of wire-like element 3a (that is, all wire-like elements are identical to each other). The wire-like element includes two second portions 11a, 11b, and a first portion 12 which connects the first portions to the base 2.

The plurality of wire-like elements thus forms simple closed curves 15b, which in this case are rhombi. Each rhombus 15b is formed by two parts of second portions 11a, 11b of two different wire-like elements.

The plurality of rhombi 15b forms a net 16c. The net forms as an envelope a cylindroid surface. Cross sections of the envelope along planes perpendicular to the Z axis defines closed curve having the form of an octagon.

Figure 8:
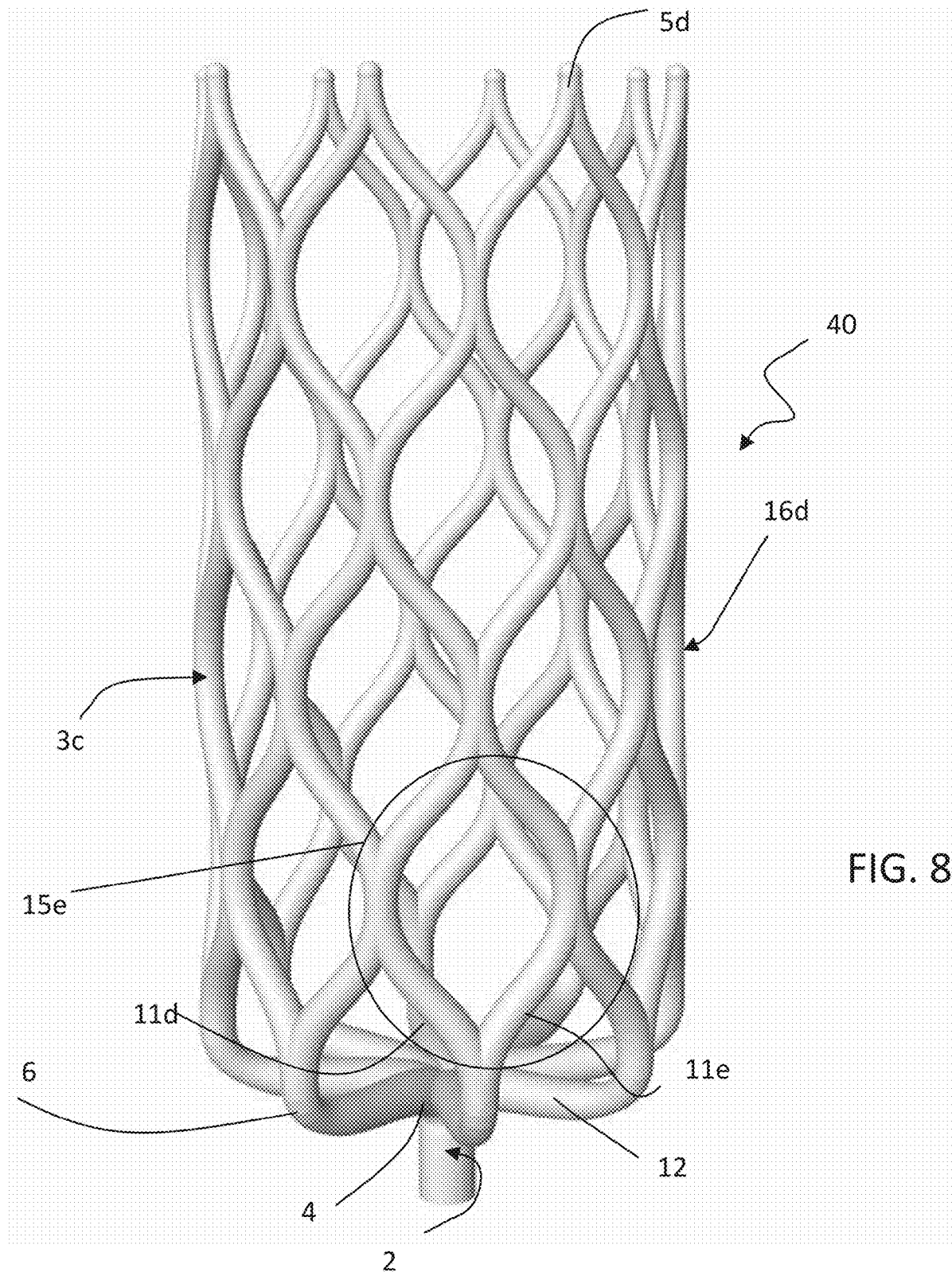
FIG. 8 is a perspective view of a fifth embodiment of a sprue structure realized according to the present invention.

With now reference to FIG. 8, a fifth embodiment of a sprue structure 40 realized according to the invention is depicted.

The sprue structure 40 comprises a base 2, substantially cylindrically shaped, which defines a Z axis, which is the axis of the cylinder. The sprue structure 40 further includes a plurality of wire-like elements 3c, all having a first end 4 and a second ends 5c. The first ends 4 of the wire-like elements 3c is connected to the base 2.

In this embodiment of sprue structure 40, each wire-like element comprises two second portions 11d, 11e forming the net and a first portion 12 substantially perpendicular to the Z axis, or slightly tilted to orthogonality. This first portion is identical to the first portion of the first embodiment in FIG. 1. The first portions 12 of all the wire-like elements 3c are connected to the base 2 in a stellar manner, that is, they form a star configuration. The angular distance between two second portions of nearest neighbor wire-like elements is preferably the same among all wire-like elements.

The first portion 12 is substantially straight and substantially perpendicular to the Z axis. The first portion at the bend 6 bifurcates in the two second portions 11d, 11e. The second portions 11d, 11e then converge again and forms closed loops 15e. Closed loops 15e one on top of the other are thus formed, the wire-like element is splitting in two and merging again at regular intervals. Two closed loops of nearest neighbor wire-like elements 3c intersect.

Each second portion 11d, 11e intersects other second portions 11d, 11e of several other wire-like elements 3c in its extension.

The sprue structure 40 includes therefore a single type of wire-like element 3c (that is, all wire-like elements are identical to each other). The wire-like element includes two second portions 11d, 11e, and a first portion 12 which connects the first portions to the base 2.

The plurality of wire-like elements thus forms simple closed curves 15e, which in this case are loops. Each loops 15e is formed by two parts of the second portions 11d and 11e of the same wire-like element.

The plurality of loops 15e forms a net 16d. The net forms as an envelope a cylindroid surface. Cross sections of the envelope along planes perpendicular to the Z axis defines closed curve having the same form.

Figure 4:
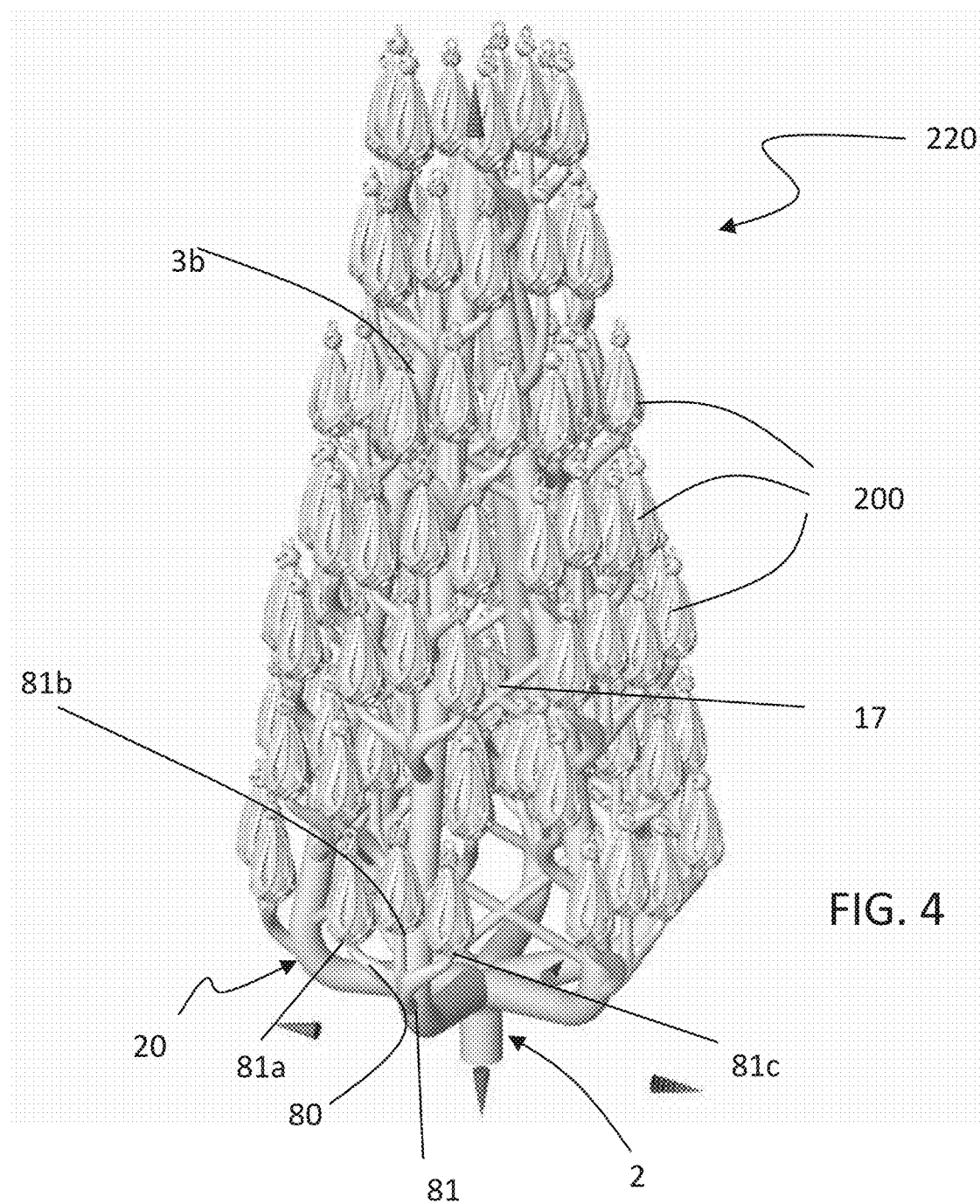
FIG. 4 is a perspective view of an investment casting model comprising the third embodiment of a sprue structure of FIG. 3 and a plurality of object models realized according to the present invention.

FIG. 4 shows a first embodiment of investment casting model 220 using the sprue structure 20 of the embodiment of FIG. 3. The investment casting model 220 includes a plurality of object models 200. In this case, all object models 200 are identical.

Each object model 200 is connected to either bars 17 or wire-like element 3b of the sprue structure 20. The connection is made via connecting branches 80. Each connecting branch 80 includes a first end 81 fixed to the wire-like element 3b or bar 17. The connecting branch 80 further includes three second ends 81a, 81b. 81c, each connected to a different object. The whole net formed by the sprue structure 20 is thus covered by object models 200.

Figure 6:
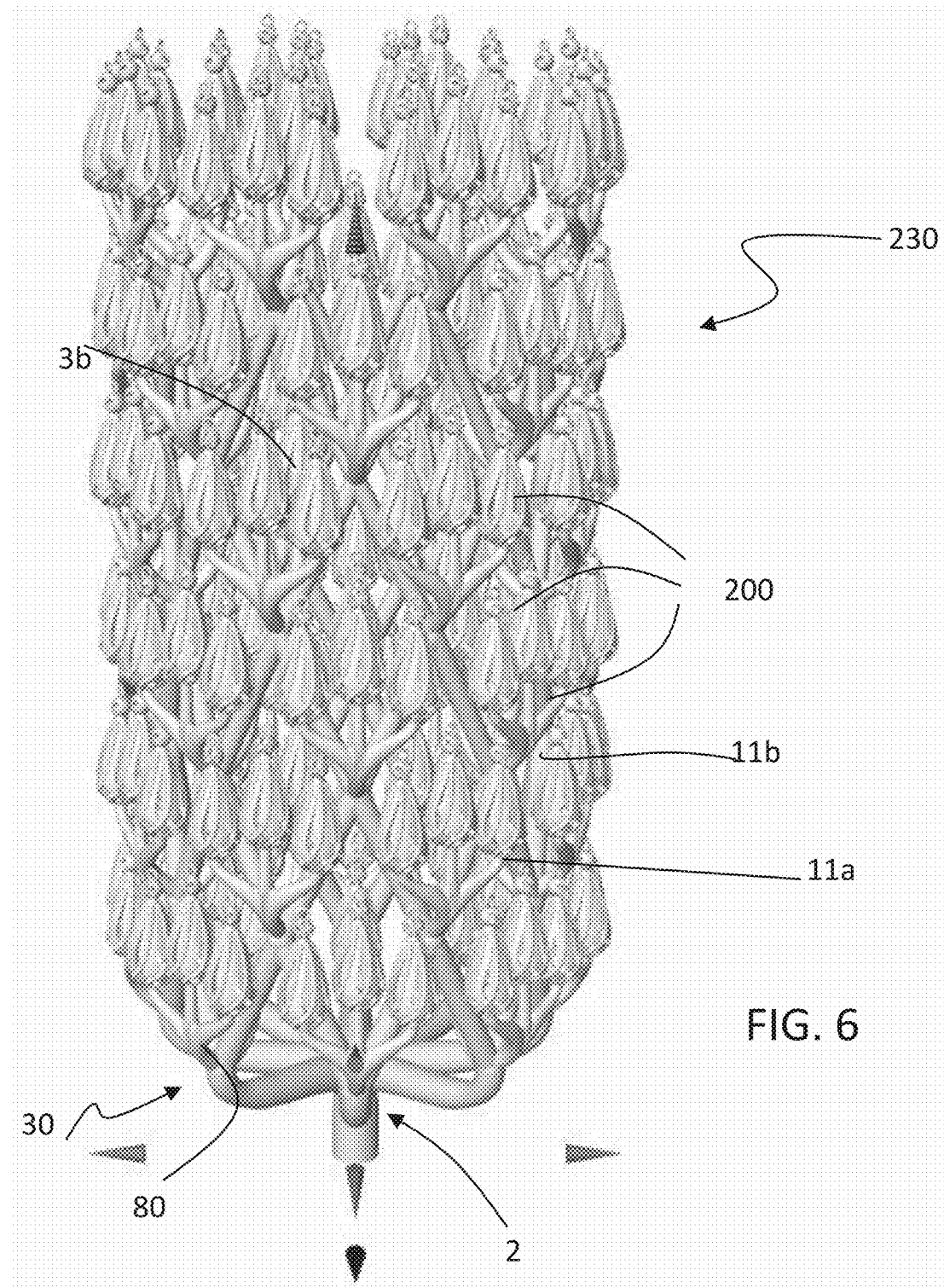
FIG. 6 is a perspective view of an investment casting model comprising the fourth embodiment of a sprue structure of FIG. 5 and a plurality of object models realized according to the present invention.
Figure 7:
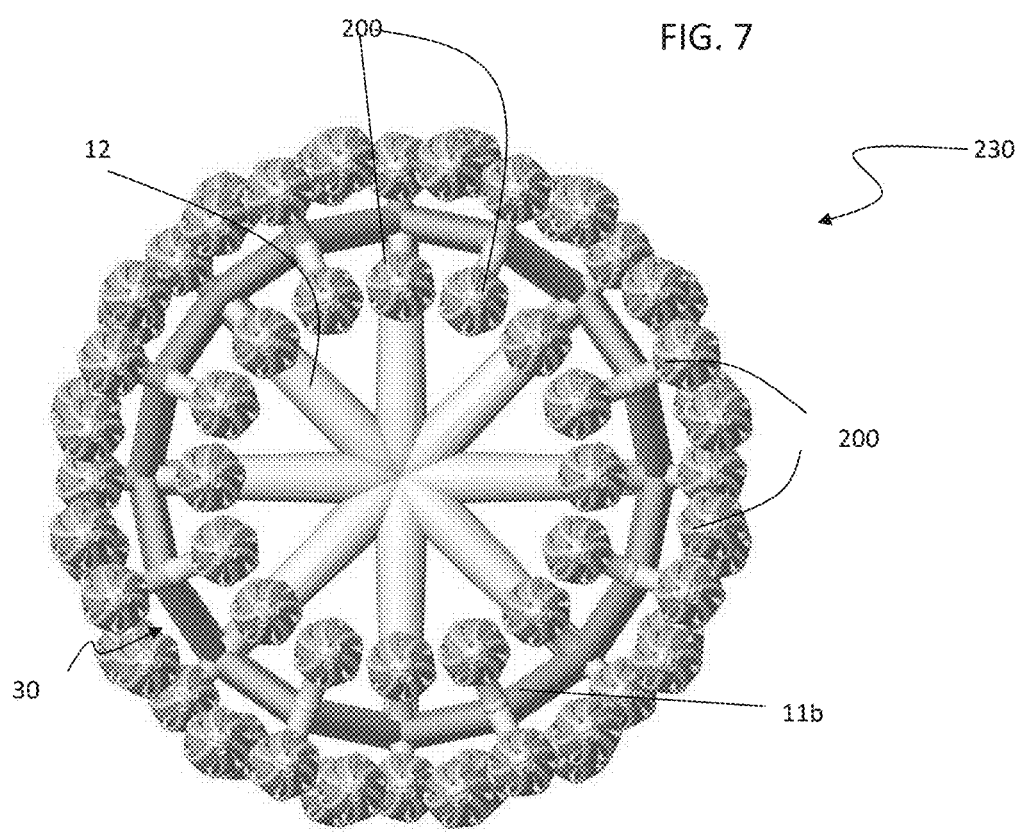
FIG. 7 is a top view of the investment casting model of FIG. 6.

FIGS. 6 and 7 show a second embodiment of investment casting model 230 using the sprue structure 30 of the embodiment of FIG. 5. The investment casting model 230 includes a plurality of object models 200. In this case, all object models 200 are identical.

Each object model 200 is connected to second portions 11a or 11b of wire-like element 3a of the sprue structure 30. The connection is made via connecting branches 80. Connecting branches 80 are identical as in the example of FIG. 4. The whole net formed by the sprue structure 30 is thus covered by object models 200.

In the top view of FIG. 7, it is clear that the object models 200 can be connected on both sides of the net formed by the sprue structure 30.

Figure 9:
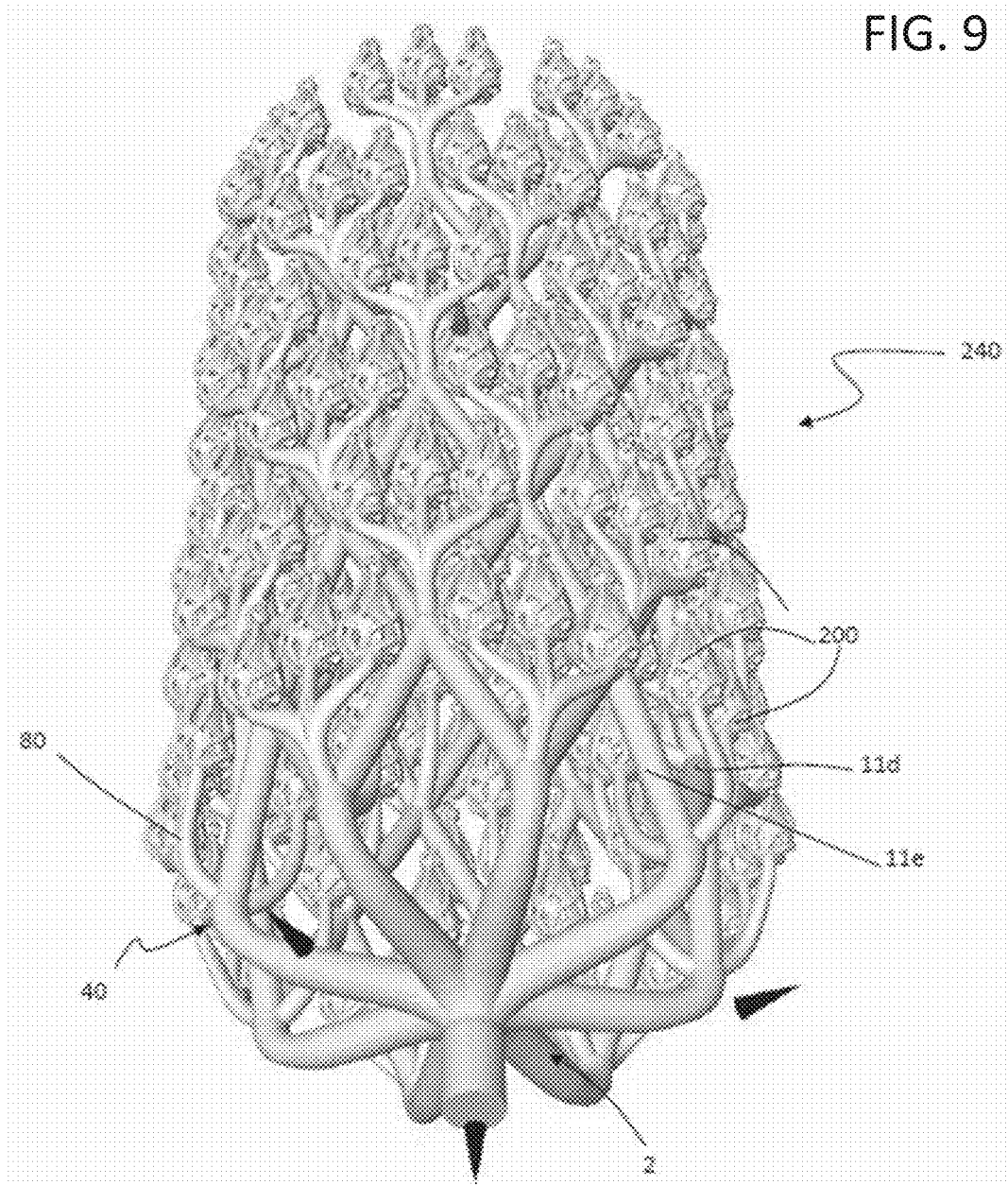
FIG. 9 is a perspective view of an investment casting model comprising the fifth embodiment of a sprue structure of FIG. 8 and a plurality of object models realized according to the present invention.

FIG. 9 shows a third embodiment of investment casting model 240 using the sprue structure 40 of the embodiment of FIG. 8. The investment casting model 200 includes a plurality of object models 200. In this case, all object models 200 are identical.

Each object model 200 is connected to either second portions 11d, 11e of wire-like element 3c of the sprue structure 40. The connection is made via connecting branches 80, similar to those of FIGS. 4 and 6. The whole net formed by the sprue structure 40 is thus covered by object models 200.

Figure 10:
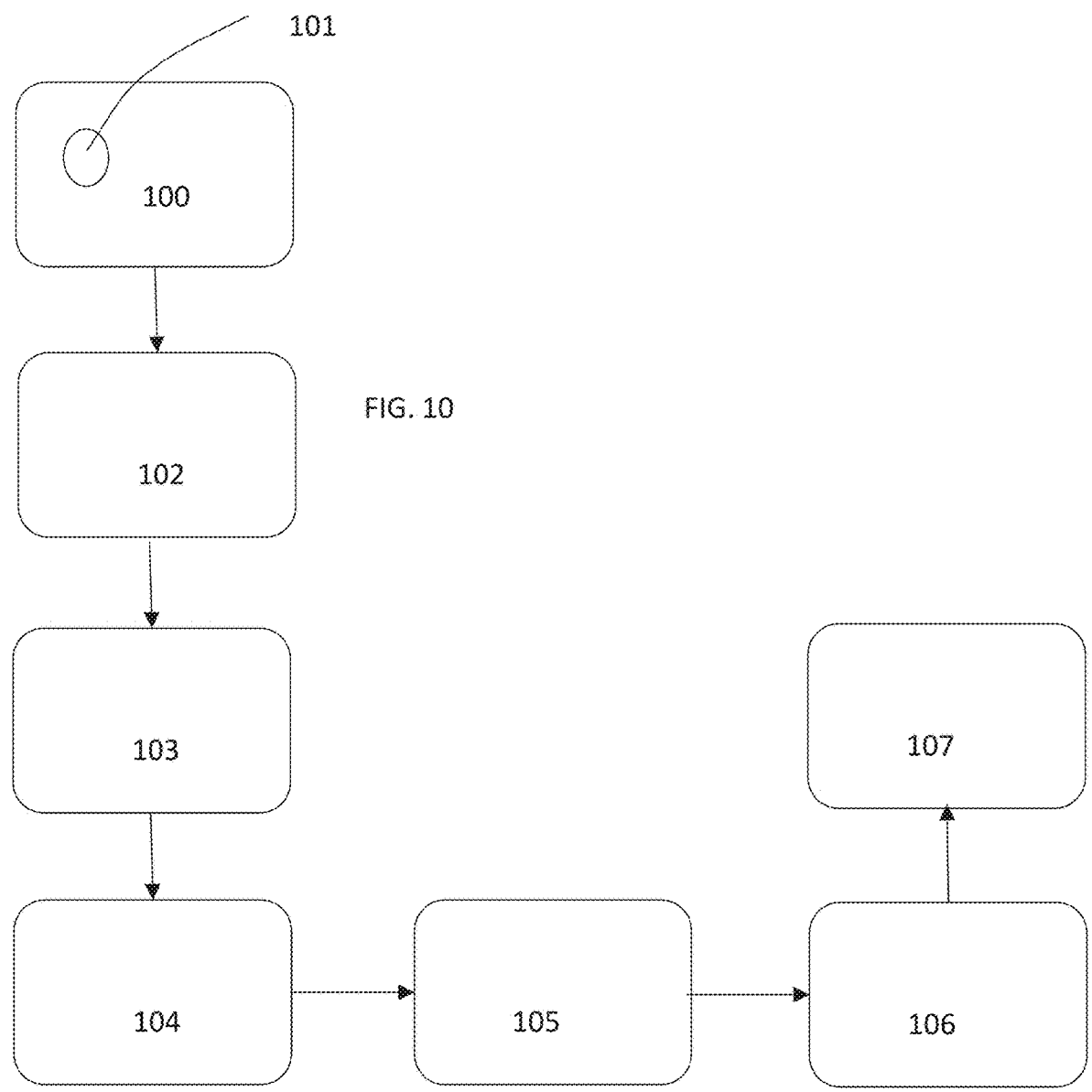
FIG. 10 is a schematic representation of the steps of the method of the invention.

The investment casting models of the above FIGS. 4, 6, 9 and of the sprue structures of FIGS. 1, 2, 3, 5, 8 are made according to the method of the invention shown schematically in FIG. 10.

In a first step 100 of the method of the invention a file 101 is created representing the investment casting model to be realized, be it the investment casting model of any of the above figures or any other investment casting model. Therefore, the file is a digital representation of the investment casting model then realized in resin.

Figure 11:
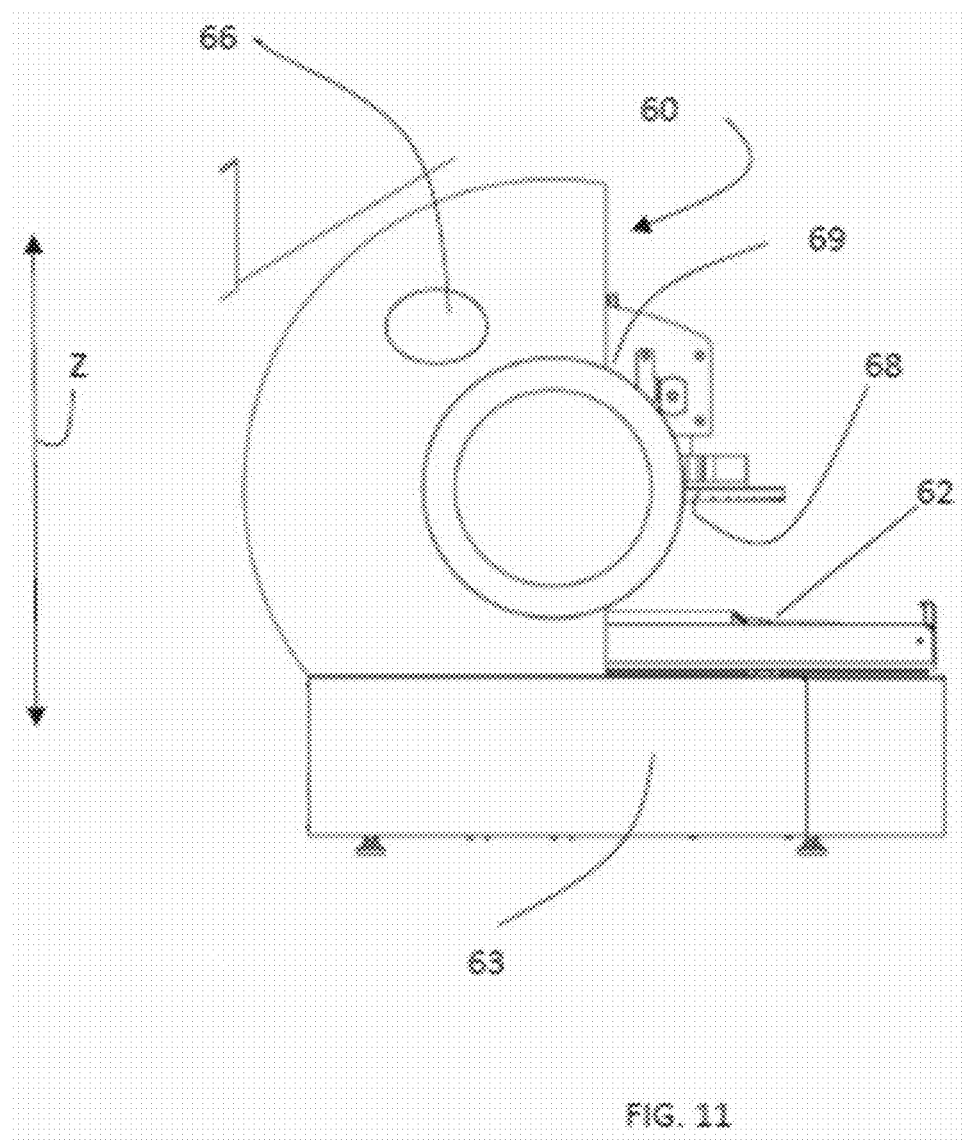
FIG. 11 is a lateral view of a 3D printer for the 3D printing of the sprue structures and/or investment casting models of FIGS. 1-9.

The file 101 is, in a suitably processed manner, sent to a stereolithography machine, such as for example the machine 60 of FIG. 11.

The stereolithography machine 60 comprises a cartridge 63 containing a resin solidifiable by exposure to a predefined electromagnetic radiation. The cartridge 63 is in fluid communication with a tank 62 so that the substance can slide inside the tank 62. The solithfiable resin is in liquid form, it can be more or less dense and, when inserted inside the chamber, its upper surface assumes a substantially flat shape.

The solidifiable resin is preferably a photosensitive liquid polymer.

The machine 60 also includes an electromagnetic source (not visible) able to emit electromagnetic radiation. The source is capable of selectively radiating a layer of solidifiable resin having a predefined thickness and disposed adjacent to a bottom of the tank 62 so as to solidify it.

The source is preferably arranged below the tank 62 and is configured to direct the electromagnetic radiation towards the bottom of the tank 62 which is preferably transparent to the electromagnetic radiation emitted by the source. Therefore, the solidifiable resin is irradiated from below. The electromagnetic radiation is selected so as to solidify the resin.

Preferably, if the solidifying resin is a photosensitive resin, the source comprises a laser light emitter associated with an optic (not shown) suitable for directing the light beam towards any point of the aforementioned solidifying resin layer.

The stereolithographic machine 60 further comprises a platform 68 having the function of supporting the model which is formed The machine 60 further includes a first actuator 69 connected to the platform 68 adapted to move it with respect to the bottom of the tank 62 according to a modelling direction Z preferably perpendicular to the same bottom. This Z direction is shown in FIG. 11 by an arrow. Preferably, this direction is parallel to the vertical axis (Z). In particular, the platform 68 is made in such a way that a layer of the solidifiable resin adheres to it once it has solidified.

Moreover, the stereolithographic machine 60 includes or is connected to a processor 66 (schematically indicated in FIG. 11) which controls the machine 60 and which includes a user interface where parameters can be entered or modified.

Given the processed file 101, for example sent to the processor 66, the parameters of the stereolithographic process are determined. These parameters can be entered via a user interface or can be determined automatically or present in file 101.

The parameters may be one or more of the following:
parameters related to the layers. Sectioning and shrinking.
The dimensions of the layers may be variable;

parameters related to the path that is scanned by a laser source (in case the electromagnetic source is a laser source). These parameters include filling, delimiting, z compensation, etc.;

parameters of an electromagnetic source (power, size of the laser beam, etc.).

Based on the parameters, the following 3D printing steps 102 are performed for each cycle, as shown in FIG. 10.

The electromagnetic source radiates the tank 62 as a function of the determined pattern by the processed file 101 obtained in step 100. The layer of the solidifiable resin is selectively irradiated in order to obtain a solidified layer, which adheres to the platform 68.

Subsequently, the platform 68 is moved by the actuator 69 so as to move the solidified layers away from the bottom of the tank 62 and the cycle is repeated for the next layer.

Layer after layer, in the 3D printing step 102, the investment casting model 220, 230, 240 is made by 3D printing.

The invested casting model in resin is then immersed in a bath of a solidifiable material, for example plaster, in step 103. The solidifying material solidifies and incorporates the investment casting resin model.

The resin forming the investment casting model is then removed in step 104. In this way a mold is formed with a cavity (not shown in the figures), in which the cavity has a geometrical conformation dictated by the geometrical conformation of the resin investment casting model 220, 230, 240 and in particular by the conformation of its external surface.

In the cavity thus created, a liquid metal or other molten substance is poured, in step 105. The metal is then allowed to cool until it is solidified. The geometry of the cavity allows the liquid to reach each part of the same as well as controlled cooling with good control of the temperature gradient. Eventually, the mold can be placed in rotation to favor the reaching of each part of the cavity by the metal. A vacuum pressure can also be applied.

Once the cooling is achieved, the mold is broken or otherwise removed and a metal model of the resin investment casting model is obtained, in step 106.

Therefore, the metal model is further processed in step 107, such as for example the separation of the desired objects (corresponding to the resin object models) and a possible finishing thereof.

The invention claimed is:

1. An investment casting model for the creation of a mold for investment casting of a plurality of objects, the investment casting model being realized in solidifiable resin, and comprises:
 a base defining a Z axis;
 a plurality of wire-like elements all extending from the base, the wire-like elements intersecting each other to form a plurality of simple closed curves, the plurality of simple closed curves forming a net around the Z axis;
 wherein at least two of the simple closed curves of the plurality are identical to each other and wherein the net comprises at least a first and a second sets of simple closed curves, each set forming a net sub-structure around the Z axis, the second set being adjacent to the first set along the Z axis;
 a plurality of object models; and
 a plurality of connecting branches joining the plurality of object models to the wire-like elements forming the net.

2. The investment casting model according to claim 1, wherein each of the simple closed curves comprises a plurality of sides, each side forming an angle different from 0° and 180° with the Z axis.

3. The investment casting model according to claim 1, wherein the net defines an inner volume including the Z axis internal to the net and an outer volume external to the net, and wherein the object models extend both in the inner and outer volume.

4. The investment casting model according to claim 1, wherein the plurality of simple closed curves comprise triangles, rectangles, rhombi or a combination thereof.

5. The investment casting model according to claim 1, wherein the net has an open end opposite to the base.

6. The investment casting model according to claim 1, wherein one of the plurality wire-like elements, in its extension along the Z axis, splits in more than one wire-like element.

7. The investment casting model according to claim 1, wherein an envelope of the net comprises a portion having a constant cross section.

8. The investment casting model according to claim 1, wherein a wire-like element of the plurality of wire-like elements includes a first portion connected to the base and forming an angle with the Z axis comprised between 80° and 90°.

9. The investment casting model according to claim 1, wherein all the simple closed curves of the plurality of simple closed curves are identical to each other.

10. The investment casting model according to claim 1, wherein the wire-like elements have a variable cross section.

11. The investment casting model according to claim 10, wherein the wire-like elements define a first end and a second end, the first end being connected to the base, and wherein the dimension of the cross section of the wire-like element at the first end is bigger than the dimension of the cross section at the second end.

12. The investment casting model according to claim 1, wherein the Z axis is a symmetry axis for the net.

13. A method for investment casting of a plurality of objects, the method comprising:
 a. forming a tri-dimensional image of the object to be cast;
 b. forming a tri-dimensional image of an object model using the tri-dimensional image of the object;
 c. forming a tri-dimensional image of a sprue structure to support a plurality of object models, the sprue structure including:
  i. a base defining a Z axis;
  ii. a plurality of wire-like elements extending from the base, the wire-like elements intersecting each other to form a plurality of simple closed curves, the plurality of simple closed curves forming a net around the Z axis;
  iii. wherein at least two of the simple closed curves of the plurality are identical to each other and wherein the net comprises at least a first and a second sets of simple closed curves, each set forming a net sub-structure around the Z axis, the second set being adjacent to the first set along the Z axis;
 d. creating a tri-dimensional image of an investment casting model including a plurality of the tri-dimensional images of the object models connected to the tri-dimensional image of the sprue structure;
 e. realizing the investment casting model in solidifiable resin by 3D printing using the tri-dimensional image of the investment casting model;

f. forming a mold by inserting the investment casting model in a bath of a shell-forming material and hardening the shell-forming material;
g. removing the solidifiable resin forming the investment casting model from the mold;
h. pouring a molten substance into the mold;
i. solidifying the molten substance; and
j. removing the solidified substance from the mold.

* * * * *